(12) United States Patent
Jan et al.

(10) Patent No.: US 9,877,170 B2
(45) Date of Patent: Jan. 23, 2018

(54) CROSS-ACCOUNT NOTIFICATION METHOD AND ELECTRONIC DEVICE USING THE SAME

(71) Applicant: ASUSTeK COMPUTER INC., Taipei (TW)

(72) Inventors: Ren-Jung Jan, Taipei (TW); Pai-Hsiang Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 3 days.

(21) Appl. No.: 14/973,745

(22) Filed: Dec. 18, 2015

(65) Prior Publication Data

US 2016/0183216 A1 Jun. 23, 2016

Related U.S. Application Data

(60) Provisional application No. 62/095,065, filed on Dec. 22, 2014.

(30) Foreign Application Priority Data

Nov. 17, 2015 (TW) ............................. 104137867 A

(51) Int. Cl.
*H04W 4/12* (2009.01)
*H04L 12/58* (2006.01)

(52) U.S. Cl.
CPC .............. *H04W 4/12* (2013.01); *H04L 51/24* (2013.01)

(58) Field of Classification Search
CPC ...... G06F 3/0482; H04L 51/04; H04L 12/581; H04L 12/588; H04L 51/24; H04L 51/32; H04L 67/26; G06Q 50/01; H04W 4/12
See application file for complete search history.

(56) References Cited

U.S. PATENT DOCUMENTS

| | | | |
|---|---|---|---|
| 8,315,607 B2 | 11/2012 | Chen et al. | |
| 9,268,772 B2 | 2/2016 | Xie | |
| 9,313,629 B2 | 4/2016 | Chen et al. | |
| 2010/0179995 A1* | 7/2010 | Wang | G06Q 10/107 709/206 |
| 2010/0255817 A1 | 10/2010 | Chen et al. | |
| 2013/0150099 A1 | 6/2013 | Chen et al. | |
| 2013/0173532 A1 | 7/2013 | Xie | |
| 2013/0326367 A1* | 12/2013 | Nakamura | H04M 1/72552 715/752 |
| 2014/0181934 A1* | 6/2014 | Mayblum | H04L 63/10 726/7 |

FOREIGN PATENT DOCUMENTS

| | | |
|---|---|---|
| CN | 102413073 | 4/2012 |
| CN | 102521407 | 6/2012 |
| CN | 103188127 | 7/2013 |

* cited by examiner

*Primary Examiner* — Nam Huynh
(74) *Attorney, Agent, or Firm* — JCIPRNET

(57) ABSTRACT

A cross-account notification method and an electronic device using the same are provided. The method includes: tagging multiple application programs of multiple accounts of the electronic device; receiving a first notification of the tagged first application program of the first account; determining whether the first notification needs to be transmitted to a second account according to a notification setting; transmitting the first notification to the second account according to the notification setting.

6 Claims, 3 Drawing Sheets

CROSS-ACCOUNT NOTIFICATION METHOD AND ELECTRONIC DEVICE USING THE SAME

CROSS-REFERENCE TO RELATED APPLICATION

This application claims the priority benefits of U.S. provisional application Ser. No. 62/095,065, filed on Dec. 22, 2014 and Taiwan application Serial No. 104137867, filed on Nov. 17, 2015. The entirety of each of the above-mentioned patent applications is hereby incorporated by reference herein and made a part of specification.

BACKGROUND OF THE INVENTION

Field of the Invention

The invention relates to a notification method and, more particularly, to a cross-account notification method and an electronic device using the same.

Description of the Related Art

Generally speaking, a user operates a personal electronic device after the user logins an operating system via an account. For example, the user logins an account "A" in the electronic device, and an application program "a" is installed/executed in the operating system under the account "A". However, the application program installed under different accounts cannot be executed cross-account. Thus, when the user logins an account "B" in the same electronic device, the user cannot execute the application program "a" installed in the account "A", and the user also cannot get an event notification sent by the application program "a" installed at the account "A". That is to say, the event notification of the application program cannot be transmitted cross-account, and thus the user cannot immediately response the event notification of the application program at another account, which is rather inconvenient.

BRIEF SUMMARY OF THE INVENTION

According to a first aspect of the present disclosure, a cross-account notification method applied to an electronic device, wherein a first account and a second account are registered in the electronic device, the method comprises: providing a notification setting; tagging an application program under the first account according to the notification setting; receiving a first notification of the tagged application program under the first account; and transmitting the first notification to the second account according to the notification setting.

Furthermore, according to a second aspect of the present disclosure, an electronic device, wherein multiple accounts are registered in the electronic device, the electronic device comprises: a display unit; a storage unit including a receiving module and a notification management module, wherein the receiving module tags an application program of the accounts and receives a first notification of the tagged application program, the notification management module stores a notification setting and manages the received first notification and determines whether the first notification needs to be transmitted; and a processing unit connected to the storage unit and the display unit.

To better understand the disclosures, embodiments are set forth below as examples implementing the disclosure. In addition, same or similar component/structure/step is denoted by a same number throughout the figures.

DETAILED DESCRIPTION OF THE EMBODIMENTS

Figure 1:
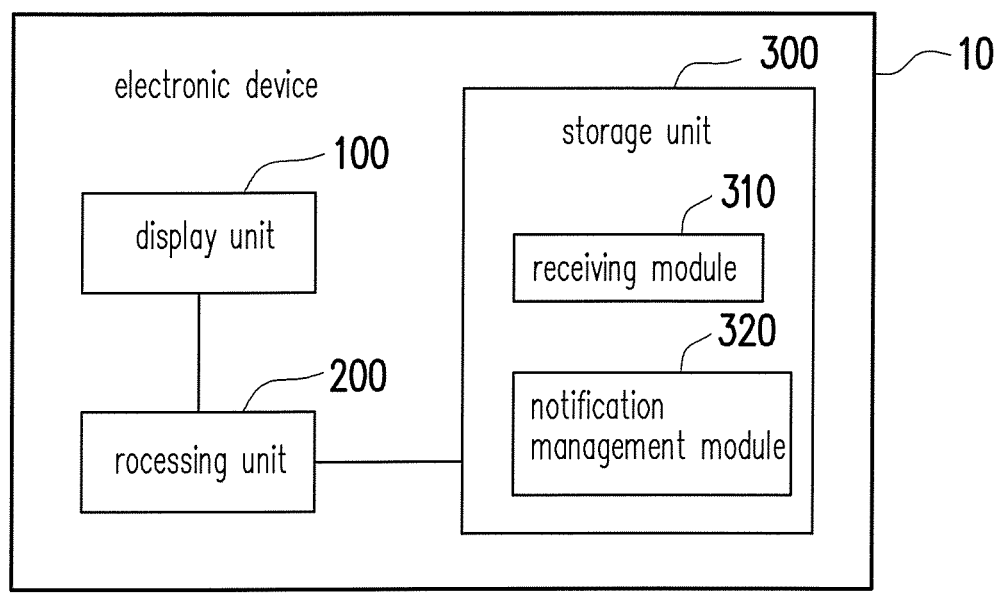
FIG. 1 is a block diagram showing an electronic device in an embodiment.

FIG. 1 is a block diagram showing an electronic device in an embodiment.

Please refer to FIG. 1, an electronic device 10 includes a display unit 100, a processing unit 200 and a storage unit 300. In the embodiment, the electronic device 10 is a mobile device (such as a mobile phone, a PDA (Personal Digital Assistant), a tablet computer), a personal computer or a notebook with multiple accounts.

In the embodiment, the account is used to login operating system of the electronic device. After a name and a password corresponding to the account are verified, the user gets an operating authorization and enters into the operation environment of the operating system corresponding to the logged account. In an embodiment, the electronic device 10 is a smart phone.

The display unit 100 displays a screen of the operating system of the electronic device 10. The display unit 100 is, for example, an LCD (Liquid Crystal Display), an LED (Light-Emitting Diode) display or an FED (Field Emission Display). In embodiment, the display unit 100 is a touch display unit including display panels and touch panels (such as a resistive panel, a capacitive panel, and an optical panel) to provide displaying function and touch operating functions, which is not limited herein.

The storage unit 300 stores user data or software/firmware which controls or manages the electronic device. The storage unit 300 can be any type of HDD (hard disk drive) or a Non-volatile memory storage device. In one embodiment, the electronic device is a smart phone, and the storage unit 300 is a Non-volatile memory storage device.

In the embodiment, multiple modules are configured or stored in the storage unit 300, such as a system UI (user interface) installed in the electronic device 10 or programming codes integrated in the operating system of the electronic device 10. In the embodiment, the modules include a receiving module 310 and a notification management module 320. The receiving module 310 tags at least one application program of the accounts to receive at least one notification of the tagged application program of the accounts. The notification management module 320 stores notification settings and manages the notifications received from the receiving module 310.

In the embodiment, the receiving module 310 and the notification management module 320 are operated in the electronic device 10 continuously. Additionally, the receiving module 310 and the notification management module 320 are operated independently from the accounts of the electronic device 10. No matter whether any account is newly logged in the electronic device 10, the receiving module 310 and the notification management module 320 operate continuously. The function and the operation of the receiving module 310 and notification management module 320 are illustrated with FIG. 2 and FIG. 3.

The processing unit 200 is connected to the display unit 100 and the storage unit 300. The processing unit 200 is hardware (such as a chip or a processor) with operational capability to control operations of the electronic device 10. In the embodiment, the processing unit 200 is a CPU (Central Processing Unit), a micro-processor or any other programmable microprocessors, a DSP (Digital Signal Processor), a programmable controller, an ASIC (Application Specific Integrated Circuits), a PLD (Programmable Logic Device), which is not limited herein. The processing unit 200 accesses and executes the receiving module 310 and the notification management module 320 stored in the storage unit 300 to execute the cross-account notification method.

Figure 2:
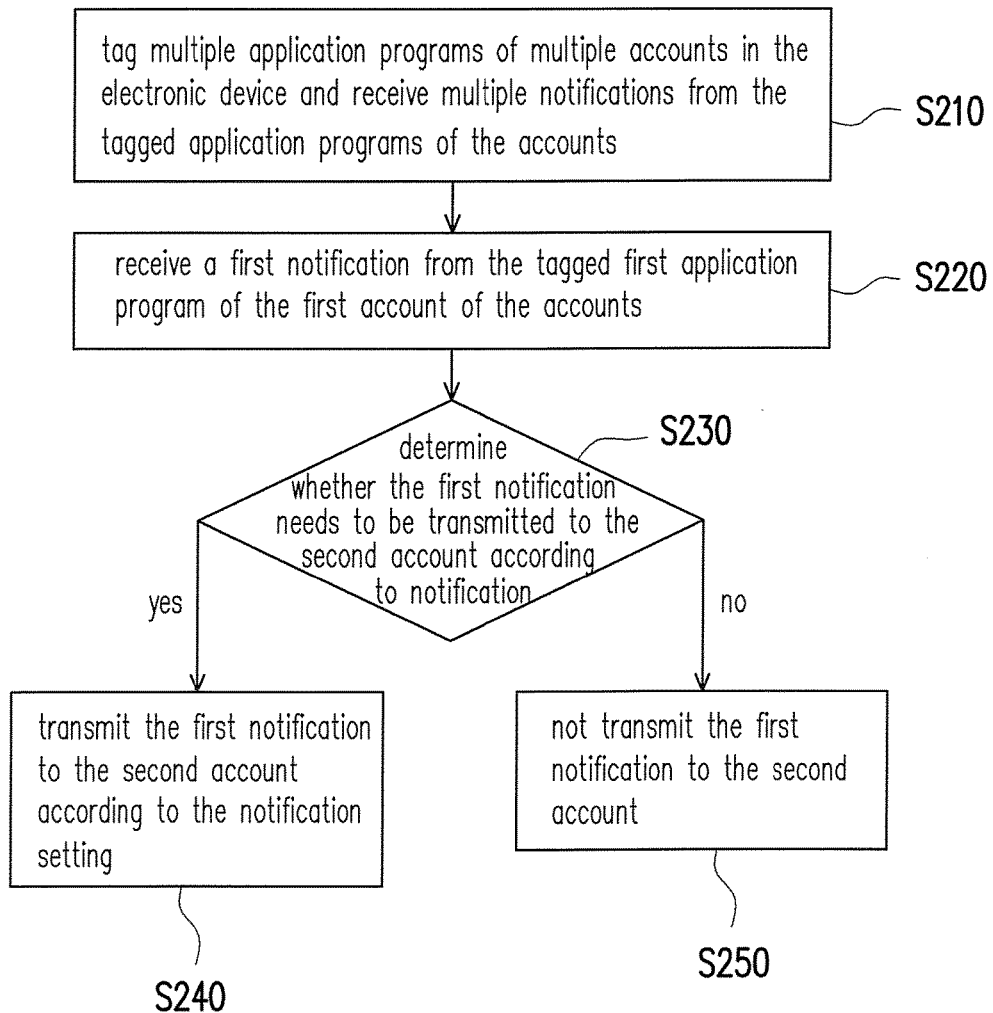
FIG. 2 is a flow chart showing a cross-account notification method in an embodiment.

The cross-account notification method in an embodiment is illustrated with FIG. 1 and FIG. 2. FIG. 2 is a flow chart showing a cross-account notification method in an embodiment.

Please refer to FIG. 1 and FIG. 2, Step S210 is to tag multiple application programs of multiple accounts of the electronic device 10 and receive multiple notifications of the tagged application programs of the accounts. In one embodiment, the receiving module 310 tags multiple application programs of multiple accounts of the electronic device 10 and receives multiple notifications of the tagged application programs of the accounts.

In an embodiment, a notification setting is executed after an account (a first account) is logged in. The notification management module 320 sets notification setting corresponding to each account, respectively, according to requirements. Consequently, the application programs (the first application program) of the first account can be managed. The interface for setting the notification setting can be configured according to practical requirements.

In an embodiment, the notification setting includes: setting whether to notice other accounts besides the first account, assigning a receiving account, setting a one-way or a two-way mode notification, and setting whether a text message of the first account is fully disclosed, which is not limited herein. In an embodiment, the category of the notification setting is more than two of above.

In the embodiment, the user tags an application program A of the first account in the notification setting, and then when the user logins via other accounts, the notification of the tagged application program A of the first account is received at other accounts. For example, the first account is an instant messaging application program and which is tagged by a user in the notification setting. According to the above notification setting, the receiving module 310 correspondingly tags the instant messaging application program and receives the notification from the tagged instant messaging application program. In the embodiment, the notification management module 320 determines the application program to be tagged (such as the instant messaging application program) and receives the notification of the tagged application program.

In an embodiment, the notification management module 320 further indicates the processing unit 200 to keep executing of the instant messaging application program. For example, the notification management module 320 indicates the processing unit 200 not to stop processing corresponding to the instant messaging application program. In other words, when the first account is logged out from the electronic device, the processing unit 200 still executes the instant messaging application program in the background. Thus, when a first event is occurred at the instant messaging application program, a first notification corresponding to the first event is transmitted to the receiving module 310.

In an embodiment, the setting of tagging the application program is set in advance. For example, all application programs in the first account are set to transmit the first notification to all the accounts except the first account. That is to say, the receiving module 310 receives notifications of all the application programs (such as all application programs are tagged). In an embodiment, the application programs is tagged according to the using habits of the users, for example, all application programs executed in the first account before are tagged by the receiving module 310.

S220 is to receive the first notification of the tagged first application program of the first account of the accounts. In one embodiment, the receiving module 310 receives the first notification of the tagged first application program of the first account of the accounts. In an embodiment, the receiving module 310 tags the first application program, thus, when a first event is occurred at the tagged first application program, the first notification corresponding to the first event is transmitted to the receiving module 310.

Step S230 is to determine whether the first notification needs to be transmitted to a second account according to the notification setting. In one embodiment, the notification management module 320 determines whether the first notification needs to be transmitted to a second account according to the notification setting. In an embodiment, the first account, in which the first notification of the first application program is transmitted, is different from the second account currently logged in the electronic device 10, the notification management module 320 determines whether the first notification needs to be transmitted to the second account according to the notification setting stored in notification management module 320 when the first account is logged in. In other words, when the first account logins, the user sets whether the notifications of the application programs of the first account are transmitted to other accounts in the notification settings. In the embodiment, the number of the second account is equal or greater than one.

In an embodiment, when the first account is logged in the electronic device 10, the notification management module 320 determines whether the notification of the tagged application program of the first account needs to be transmitted to the second account. In embodiments, the notification setting is to set a one-way or a two-way notification between the first account and the second account, set a master-slave relation between the accounts, and/or set whether notifications are not transmitted cross-account, which is not limited herein.

In an embodiment, the notification management module 320 further identifies the account currently logged in the electronic device 10. If the notification management module 320 identifies the account currently logged in the electronic device 10 is the first account, the notification management module 320 directly transmits the first notification to the first account. If the notification management module 320 identifies the account currently logged in the electronic device 10 is the second account, the notification management module 320 determines whether the received first notification needs to be transmitted to the second account which is currently logged in.

In an embodiment, a one-way or a two-way notification between the first account and the second account is recorded in the notification setting, the notification management module 320 determines the first notification needs to be transmitted to the second account (as in step S240) or the notification of the second account needs to be transmitted to the first account. In an embodiment, the notification setting records that notifications are not allowed to be transmitted across the first account and the second account, the notification management module 320 determines the first notification does not need to be transmitted to the second account.

In step S230, the notification management module 320 determines the first notification needs to be transmitted to the second account. Then, Step S240 is to transmit the first notification to the second account according to the notification setting. In one embodiment, the notification management module 320 transmits the first notification to the second account according to the notification setting. Thus, when the user logs in the electronic device 10 via the second account, the user also can get the information of the application programs of the first account.

Additionally, if the notification management module 320 determines the first notification does not need to be transmitted to the second account in step S230, then, step S250 is not to transmit the first notification to the second account. In one embodiment, the notification management module 320 does not transmit the first notification to the second account.

In the embodiment, the content of the first notification transmitted to the second account is adjustable. The method of adjusting the first notification to the second notification and the details of the step S250 in an embodiment are illustrated with the FIG. 1, FIG. 2 and FIG. 3.

Figure 3:
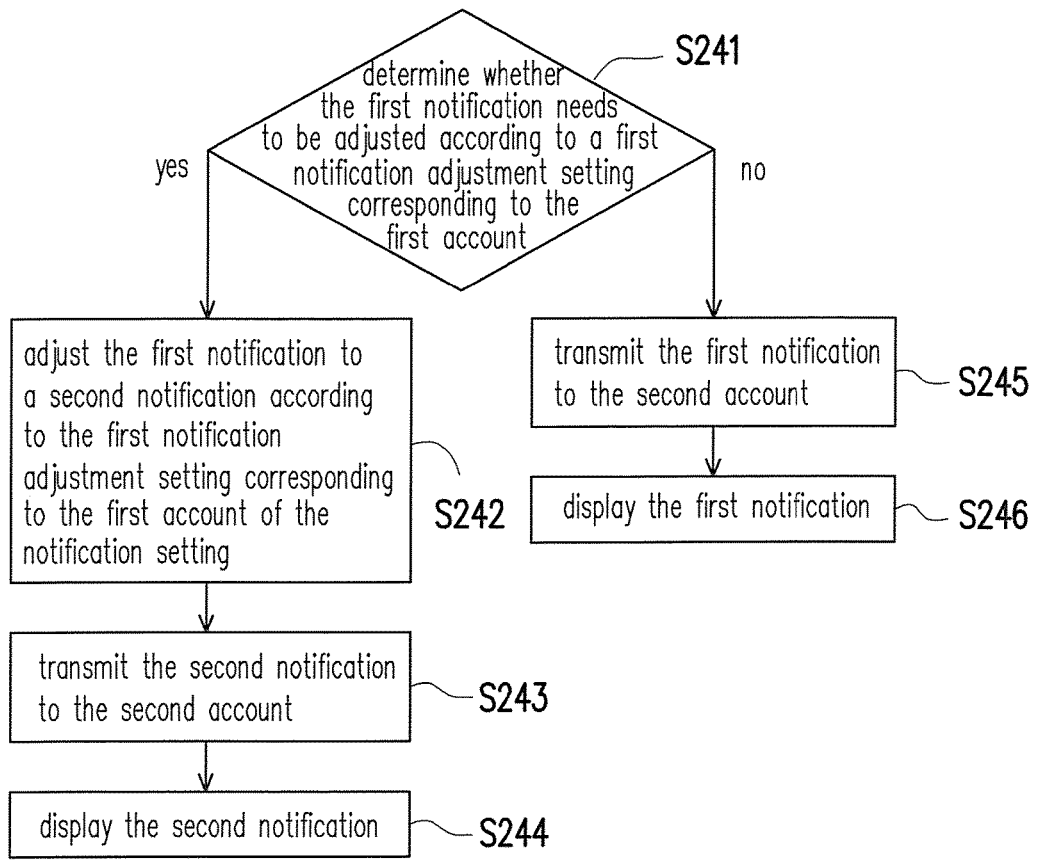
FIG. 3 is a flow chart showing a first notification is adjusted to a second notification in an embodiment.

FIG. 3 is a flow chart showing a first notification is adjusted to a second notification in an embodiment. Please refer to FIG. 1, FIG. 2 and FIG. 3, the step S240 includes the steps S241~S246 in FIG. 3. In the embodiment, the notification management module 320 determines the first notification needs to be transmitted to the second account in step S230. Step S241 is to determine whether the first notification needs to be adjusted according to a first notification adjustment setting corresponding to the first account. In one embodiment, the notification management module 320 determines whether the first notification needs to be adjusted according to a first notification adjustment setting corresponding to the first account.

Detailedly speaking, a notification adjustment setting of the notification setting is used to set whether the notification transmitted from the application program of the first account to the second account needs to be adjusted. If the notification needs to be adjusted, the notification received at the second account from the application program of the first account is different from the notification transmitted from the application program of the first account to the receiving module 310. In another embodiment, notification adjustment settings of application programs at the first account are set respectively. In other words, the notifications of some application programs at the first account is set to be adjusted before the notifications are transmitted to the second account, the notifications of other application programs are set not to be adjusted and are directly transmitted to the second account.

In step S241, the notification management module 320 determines the first notification needs to be adjusted. Then, Step S242 is to adjust the first notification to the second notification according to the first notification adjustment setting corresponding to the first account. In one embodiment, the notification management module 320 adjusts the first notification to the second notification according to the first notification adjustment setting corresponding to the first account. The first notification is different from the second notification.

For example, the type of the first notification and the second notification includes at least one of a voice prompt, a text message prompt, an image prompt, a light prompt or a vibration prompt. In an embodiment, the first notification is a text message prompt (such as a text message displayed on a status bar of a smart phone), the notification management module 320 adjusts the first notification (a text message prompt) to the second notification (a vibration prompt) according to the adjustment setting of the first notification. In another embodiment, the type of the first notification is a text message prompt (such as text message displayed at a status bar of a smart phone), the notification management module 320 adjusts the first notification (a text message prompt) to the second notification of text prompt whose content is different from that of the first notification according to the a notification adjustment setting. That is to say, the user sets the type of the notification (which is adjusted from the first notification of the first account) presented at the second account according to the requirement. In embodiments, the type of the first notification is adjusted to another type of the second notification, or the type of the first notification is adjusted to the second notification of the same type with a different content.

Detailedly speaking, in an embodiment, when the user logs in the electronic device via the first account, a first storing text message is preset to be input and stored in the first notification adjustment setting. For example, the first storing text message is "new message". When the notification management module 320 determines the first notification needs to be adjusted, the first storing text message pre-stored in the notification adjustment setting of the first notification is adjusted to the second notification and transmitted. That is to say, all the first notifications received at other accounts (except the first account) from the first account are displayed as the pre-stored first storing text "new message", and the content of the first notification is not directly displayed.

After the first notification is adjusted in step S242, Step S243 is to transmit the second notification to the second account. In one embodiment, the notification management module 320 transmits the second notification to the second account. Step S244 is to display the second notification. In one embodiment, the notification management module 320 displays the second notification via the display unit 100.

If the notification management module 320 determines the first notification does not need to be adjusted in step S241, the notification management module 320 maintains the type and content of the first notification, and the first notification is transmitted to the second account in step S245. In step S246, the first notification is shown by the display unit 100.

In the above embodiment, the notification management module 320 shows the first notification via the display unit 100, which is not limited herein. In another embodiment, the notification management module 320 does not prompt the first notification or the second notification via the display unit 100, the first notification or the second notification is prompted via a voice prompt, a light prompt, a vibration prompt or other notification types.

In another embodiment, the notification management module 320 determines whether the first notification (or the second notification after adjusted) transmitted to the second account is clicked. Then, operations after the click operation are executed.

In an embodiment, the first notification transmitted to the second account is not adjusted. Detailedly speaking, if the notification management module 320 determines that the displayed first notification is clicked, the notification management module 320 notices the processing unit 200 to execute the login procedure. In an embodiment, the login procedure is that requesting the user to input account verification corresponding to the first account. When the first account is logged in the electronic device, the notification management module 320 indicates the processing unit 200 to execute a first application program corresponding to the first notification.

For example, when a mail application program of the first account (which is not currently logged in the electronic device 10) receives a new mail, the mail application program transmits the first notification of the text message "new message" to the receiving module 310. The first notification is displayed in the operation environment of the second account (which is currently logged in the electronic device 10). For example, the text message "new mail" is displayed on the smart phone. When the user clicks the displayed first notification, the notification management module 320 indicates the processing unit 200 to execute the first login procedure.

In an embodiment, the first login procedure is to provide a login screen to request the user to enter a password corresponding to the first account (or other verification methods) to verify the user authentication. If the password input by the user is correct (verification is passed). The current login account at the electronic device 10 is changed from the second account to the first account, and the notification management module 320 indicates the processing unit 200 to execute the mail application program corresponding to the first account to receive a first operation corresponding to the first event.

In an embodiment, the function of determining whether the first notification is clicked can be disabled by modifying the notification setting.

In the embodiment, the receiving module 310 and the notification management module 320 are two separate programming code modules, which is not limited herein. For example, in another embodiment, the function of the receiving module 310 is integrated into the notification management module 320.

The method in embodiments is realized in a hardware, a firmware, or realized in a software or a computer code stored in the recording mediums (such as a CD ROM (Compact Disc Read-Only Memory), a RAM (Random-Access Memory), a floppy disk, a HD (Hard Disk), a magneto-optical disc), or realized in a software or computer codes (such as the receiving module 310 and notification management module 320) downloaded from the network and stored in a non-transitory computer readable storage medium, thus the method is applied to a software, a specialized processor, a programmable hardware or a specialized hardware (such as ASIC (Application Specific Integrated Circuit) or FPGA (Field Programmable Gate Array) of computers. The computer, the processor, the microprocessor controller or the programmable hardware includes a storage unit (such as a RAM (Random-Access Memory), a ROM ((Compact Disc Read-Only Memory), a flash memory) which can store or receive software or computer codes. When the software or the computer code is accessed and executed by the computer, the processor or the hardware executes the method in embodiments.

As stated above, a cross-account notification method and an electronic device using the same are provided. An event notification sent by an application program of an account which is not logged in the electronic device is transmitted instantaneously cross-account, and then the user can response the event notification of the application program of the account which is currently not logged in, and then the important event of the account which is not logged would not be missed, and the work efficiency is increased.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A cross-account notification method applied to an electronic device, wherein a first account and a second account are registered in the electronic device, the second account is logged into the electronic device, and the first account has logged out from the electronic device, the method comprising:
   providing a notification setting;
   tagging an application program among a plurality of application programs of the first account according to the notification setting to execute the tagged application program in the background, wherein the tagged application program is not accessed by the logged second account, and the tagged application transmits a first notification when an event is occurred at the tagged application program;
   receiving a first notification from the tagged application program of the first account; and
   transmitting the first notification to the second account according to the notification setting,
   wherein the step of transmitting the first notification to the second account according to the notification setting comprises:
   when the first notification is determined to be adjusted according to the notification setting, the first notification is not transmitted to the second account, a first storing text message is provided as a content of a second notification, and the second notification is transmitted to the second account, wherein the first storing text message is pre-stored in a first notification adjustment setting of the notification setting under the first account;
   when the first notification is determined not to be adjusted according to the notification setting, the first notification is directly transmitted to the second account.

2. The notification method to claim 1, further comprising:
   determining whether the first notification transmitted to the second account is clicked;
   executing a first login procedure of the first account when the first notification is clicked; and
   executing the first application program conesponding to the first notification after the first account is logged in the electronic device.

3. The notification method to claim 1, wherein the notification setting includes a one-way notification or a two-way notification.

4. An electronic device, wherein multiple accounts are registered in the electronic device, the electronic device comprising:
   a display unit;
   a storage unit including a receiving module and a notification management module; and
   a processing unit connected to the storage unit and the display unit,
   wherein the notification management module stores a notification setting, and the receiving module tags an application program of a first account among the accounts according to the notification setting, wherein the receiving module receives a first notification of the tagged application program of the first account, and the notification management module detei mines whether the first notification needs to be adjusted according to a first adjustment setting of the notification setting corresponding to the first account, wherein when the first notification is determined not to be adjusted, the notification management module transmits the received first notification to a second account, wherein when the first notification is determined to be adjusted, a first storing text message is provided as a content of a second notification, and the second notification is transmitted to the second account, wherein the first storing text message is pre-stored in a first notification adjustment setting of the notification setting under the first account, and wherein the notification setting includes a one-way notification or a two-way notification, and the step of transmitting the first notification to the second account according to the notification setting comprises:

when the one-way notification is recorded in the notification setting, the first notification of the tagged application program under the first account needs to be transmitted to the second account, and a notification of the second account does not need to be transmitted to the first account; and when the two-way notification is recorded in the notification setting, the first notification of the tagged application program under the first account needs to be transmitted to the second account, and the notification of the second account needs to be transmitted to the first account.

5. The electronic device to claim 4, wherein the notification setting includes a one-way notification or a two-way notification.

6. The electronic device to claim 4, wherein the notification management module determines whether the first notification transmitted to the second account is clicked, and indicates the processing unit to execute a first login procedure and execute a first application program corresponding to the first notification when the first account is logged in the electronic device.

* * * * *